US007009022B2

(12) United States Patent
Duch et al.

(10) Patent No.: US 7,009,022 B2
(45) Date of Patent: Mar. 7, 2006

(54) MOISTURE CURABLE HIGH STRENGTH, FLEXIBLE RTV ORGANIC COPOLYMER COMPOSITIONS AND METHODS OF PREPARATION

(75) Inventors: Debora E. Duch, Glastonbury, CT (US); Steven T. Nakos, Andover, CT (US); Thomas Fay-Oy Lim, Killingworth, CT (US)

(73) Assignee: Henkel Corporation, Rocky Hill, CT (US)

( * ) Notice: Subject to any disclaimer, the term of this patent is extended or adjusted under 35 U.S.C. 154(b) by 28 days.

(21) Appl. No.: 10/736,177

(22) Filed: Dec. 15, 2003

(65) Prior Publication Data

US 2005/0131188 A1 Jun. 16, 2005

(51) Int. Cl.
*C08G 77/18* (2006.01)

(52) U.S. Cl. ........................... 528/29; 528/38; 528/28; 556/414; 525/440; 525/453

(58) Field of Classification Search ................. 528/29, 528/38, 28; 556/414; 525/440, 453
See application file for complete search history.

(56) References Cited

U.S. PATENT DOCUMENTS

| | | | | |
|---|---|---|---|---|
| 3,425,988 | A | 2/1969 | Gorman et al. | |
| 4,018,851 | A | 4/1977 | Baccei | |
| 4,191,713 | A | 3/1980 | Yonezawa et al. | 525/102 |
| 4,295,909 | A | 10/1981 | Baccei | |
| 4,309,526 | A | 1/1982 | Baccei | |
| 6,436,549 | B1 | 8/2002 | Wang | 428/480 |
| 6,756,465 | B1 * | 6/2004 | Jacobine et al. | 528/29 |

FOREIGN PATENT DOCUMENTS

| | | |
|---|---|---|
| GB | 2 154 595 | 9/1985 |

* cited by examiner

*Primary Examiner*—Kuo-Liang Peng
(74) *Attorney, Agent, or Firm*—Steven C. Bauman

(57) ABSTRACT

Flexible, moisture curing ABA triblock copolymers are prepared from poly(alkylene oxide) diols as the B segment and polyester diols as the A block. This backbone is end-capped with siloxy end groups to obtain RTV moisture curing triblocks having high strength and flexibility.

19 Claims, 2 Drawing Sheets

MOISTURE CURABLE HIGH STRENGTH, FLEXIBLE RTV ORGANIC COPOLYMER COMPOSITIONS AND METHODS OF PREPARATION

FIELD OF THE INVENTION

This invention relates to the preparation and use of high strength, flexible RTV moisture curable polymers. More particularly, the compositions of the present invention are prepared from siloxy end-capped ABA Triblock copolymers, which have a polyether and polyester backbone segments joined by urethane and/or urea linkages.

BACKGROUND OF RELATED TECHNOLOGY

Flexible RTV moisture curing polymers have been known in the art as useful adhesives, coatings, potting compounds and sealants. Silicones, urethanes, silicone/urethanes, silicone/acrylates to name a few general classes, have been widely used.

The flexibility and strength of RTV polymers will largely depend on their backbone, the relative amounts of hard and soft segments present, and the presence of strength enhancing additives such as fillers.

Often, flexible RTV polymers suffer from lack of adequate physical properties such as tensile strength. The present invention seeks to provide a convenient, cost efficient method of preparing triblock copolymers which cure under ambient conditions to provide high strength, yet flexible materials.

SUMMARY OF THE INVENTION

One aspect of the present invention provides a composition including a polymer having the formula:

I

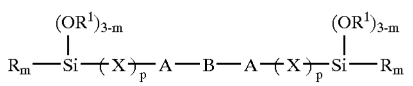

where ABA is a polyester/polyether/polyester triblock copolymer;

R is $C_{1-6}$ alkyl group or $C_6$ aryl group, which may optionally be substituted by halo, sulfur or oxygen;

$R^1$ is $C_{1-6}$ alkyl group;

m is 0–2;

X is independently at each occurrence a urethane linkage

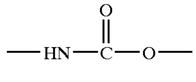

or a urea linkage

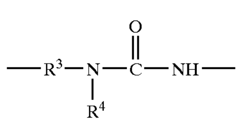

where $R^3$ is alkylene; $R^4$ is alkyl, aryl, alkaryl or aryalkyl; and p is 0 or 1.

In another aspect of the invention, there is provided a reaction product of (a) a composition including a polymer having the formula:

I

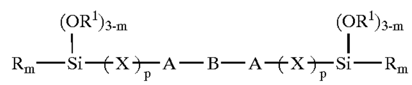

where ABA is a polyester/polyether/polyester triblock copolymer;

R is $C_{1-6}$ alkyl group or $C_6$ aryl group, which may optionally be substituted with halo, sulfur or oxygen;

$R^1$ is $C_{1-6}$ alkyl group;

m is 0–2;

X is independently at each occurrence a urethane linkage

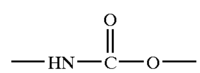

or a urea linkage

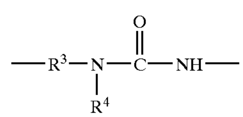

where $R^3$ is alkylene; $R^4$ is alkyl, aryl, alkaryl or aryalkyl;

p is 0 or 1; and (b) a moisture cure catalyst.

In a further aspect of the invention, there is provided a method of preparing a moisture curing composition including the steps of:

(a) reacting a NCO capped polyether polymer with a polyester diol having each of two ends terminated with a hydroxy group, where the molar ratio of NCO capped polyester prepolymer to polyether diol being equal to or less than 1:2 to form a block copolymer represented by the structure:

HO-A-B-A-OH II where B is a polyether block and A is a polyester block; and (b) further reacting the structure formed in step (a) with a molar excess of an isocyanatoalkyl polyalkoxysilane to form a moisture curable composition.

DETAILED DESCRIPTION OF THE INVENTION

Figure 1:
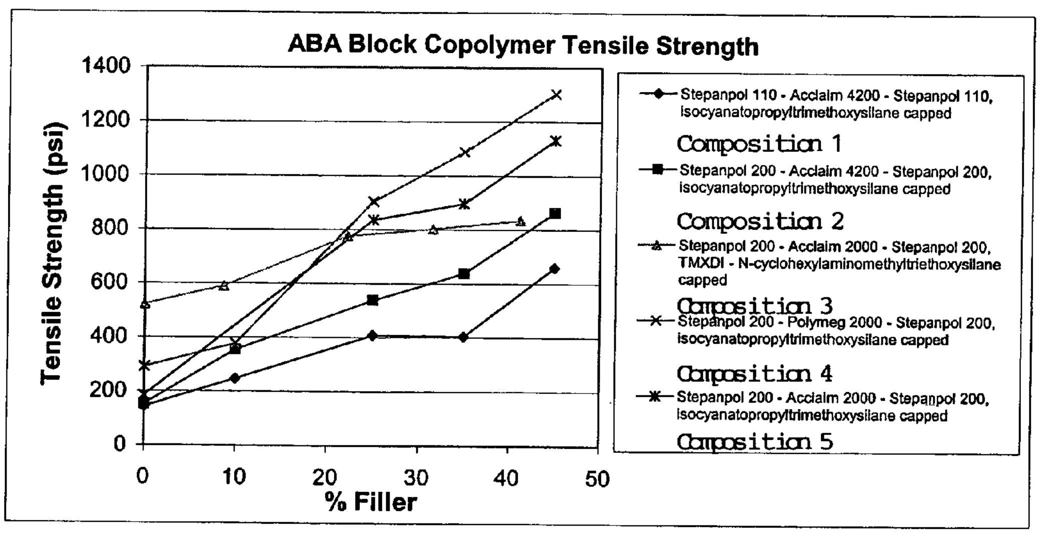
FIG. 1 is a graphic depiction of the effect on tensile strength by the addition of filler or inventive compositions 1–5 disclosed herein.

The composition of the present invention provides RTV copolymers which cure in the presence of moisture to provide high strength, flexible adhesives.

The moisture curing compositions of the present invention are triblock copolymers having the general structure:

I

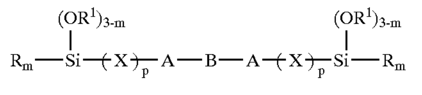

where ABA is a polyester/polyether/polyester triblock copolymer;

R is $C_{1-6}$ alkyl group or $C_6$ aryl group, which may optionally be substituted by halo, sulfur or oxygen;

$R^1$ is $C_{1-6}$ alkyl group;

m is 0–2;

X is independently at each occurrence a urethane linkage

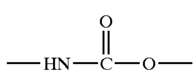

or a urea linkage

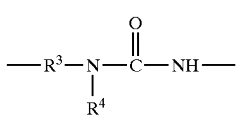

where $R^3$ is alkylene; $R^4$ is alkyl, aryl, alkaryl or aryalkyl; and p is 0 or 1.

The B block or segment of the copolymer is a polyether diradical, desirably a poly(alkylene) ether or copoly(alkylene)ether which may conform to the general structures III and IV:

III

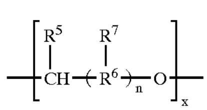

where $R^5$ is H or $C_{1-4}$ alkyl; $R^6$ is —CH—;

$R^7$ is H, $C_{1-10}$ alkyl; x is about 20 to about 100; and n is 1–10; or

IV

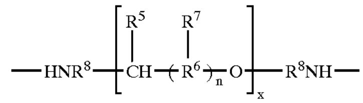

where $R^5$, $R^6$, $R^7$, n and x are defined as in structural formula III; and $R^8$ is alkylene.

The starting materials for forming the B block may conform to the following structural formulas V and VI:

V

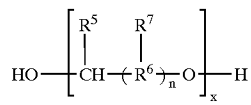

where $R^5$, $R^6$, $R^7$, n and x are defined as in structural formula III above, and $R^8$ is alkylene; or

VI

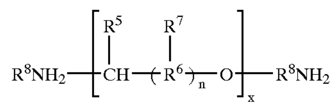

where $R^5$, $R^6$, $R^7$, $R^8$, n and x are defined as in structural formula V above.

Particularly useful polyalkylene oxide diols include polypropylene oxide diols such as those sold under the tradenames ACCLAIM sold by Bayer AG, and POLYMEG, sold by Lyondell Chemical Co., Houston, Tex. For example, Acclaim 2200 and Polymeg 2000 are commercially available poly(propylene ether) diols useful in the present invention. The molecular weight of useful polyalkylene ether diols desirably range from about 1500 to about 5,000. Large molecular weights may also be useful, depending on the degree of stiffness or flexibility desired in the final triblock copolymer.

It is particularly desirable, although not necessary, that the B block segment be linear in order to provide a high degree of flexibility in the segment and ultimately to the final triblock polymer and cured compositions thereof.

Suitable B block segments include polyethylene oxide, polypropylene oxide and polytetramethylene oxide polymers. Desirably the molecular weights of the B block segments range from about 1500 to about 5000, and more desirably from about 2000 to about 4000.

B block segments are derived from hydroxy or amino terminated poly(alkylene oxide) polymers. For example, hydroxy or amino terminated polypropylene oxide polymers are particularly useful materials for the B block segment.

The hydroxy or amino terminated polyalkylene esters useful in forming the B block segment are reacted with a diisocyanate to produce N═C═O capped polyethers which are then further reacted with the A block segment to produce the ABA triblock.

A variety of diisocyanates are useful and the choice of any particular one will largely be dictated by the commercial availability and properties desired.

Useful diisocyanates include, without limitation, tetramethylxylylene diisocyanate, phenyl diisocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, 4,4'-dicyclo-hexylmethane diisocyanate, 1,3-bis-(isocyanatomethyl) cyclohexane, cyclohexylene diisocyanate, tetrachlorophenylene diisocyanate, 2,6-diethyl-p-phenylenediisocyanate, and 3,5-diethyl-4,4'-diisocyanatodiphenylmethane, tetramethylene diisocyanate, hexamethylene diisocyanate, ethylene diisocyanate, cyclohexylene diisocyanate, nonamethylene diisocyanate, octadecamethylene diisocyanate, 2-chloropropane diisocyanate, 2,2'-diethylether diisocyanate, 3-(dimethylamine) pentane diisocyanate, tetrachlorophenylene diisocyanate-1,4,3-heptane diisocyanate and transvinylene diisocyanate.

To form the triblock ABA segment, the hydroxy terminated polyalkylene ether polyol is reacted with a diisocyanate for a time and in stoichiometric amounts sufficient to ensure N═C═O capping of the polyalkylene ether. The polyalkylene ether polyol is mixed with the diisocyanate and reacted at temperatures of about 50° C. to about 80° C. for a period of about 0.5 to 2.5 hours, desirably in inert atmosphere, such as a nitrogen blanket to form the B block isocyanate end-capped segment. To the B block isocyanate end-capped segment is added an hydroxy terminated polyester A block segment resulting in the formation of urethane linkages joining the A block segment to each end of the B segment. This results in an ABA triblock copolymer having terminal hydroxyl functionality available for further reaction with a siloxy capping group which imparts moisture curing capabilities to the final curable polymer.

Hydroxy terminated polyesters useful as the A block segments include a wide variety of materials including polyalkylene glycol esters such as polyethylene and polypropylene glycol esters. Particularly useful are poly (diethylene glycol ortho phthalates).

Among the useful polyester diols are polyaliphatic and polyaromatic esters. Among the more desirable esters are the aromatic esters such as those conforming to the general structural formula:

VII

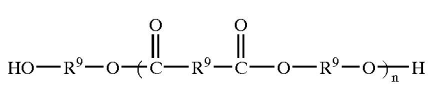

where $R^9$ is a poly(alkylene) or poly(arylene) radical and n is 1–100.

Polyaromatic esters such as those having the following formula are also useful:

VIII

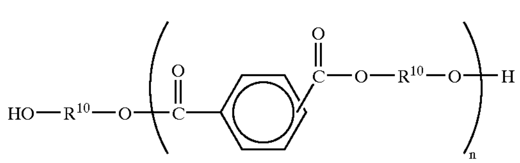

where $R^{10}$ is $C_{2-10}$ polyalkylene oxide, and desirably di-, tri- or tetra-methylene oxide.

The molecular weight of the polyalkylene esters may vary in the range of about 500 to about 1000.

Once the hydroxy terminated ABA triblock segment is formed, it is further reacted in sufficient amounts either with an isocyanatoalkylpolyalkoxy silane end capper or an NCO terminated N-cyclohexylaminoalkylpolyalkoxysilane end capper to impart moisture curing end groups to the triblock copolymer. These reactions result in the formulation of urethane linkages which join the silicone atom to the polyester A segments of ABA triblock. Useful isocyanatoalkylpolyalkoxysilanes include isocyanatomethyl-, isocyanatoethyl- and isocyanatopropyltriethoxy silane, as well as isocyanatomethyltrimethoxysilane, isocyanatoethyltrimethoxysilanes, and isocyanatopropyltrimethoxysilanes. Isocyanatoalkyldialkoxysilanes are also useful.

The isocyanatoalkylpolyalkoxysilanes generally conform to the structure:

IX

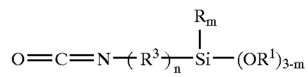

where n is 1–3; m is 0–2; R is $C_{1-6}$ alkyl or $C_6$ aryl, which may optionally be substituted by halo, sulfur or oxygen; $R^1$ is $C_{1-6}$ alkyl; and $R^3$ is alkylene.

The hydroxy terminated ABA triblock segment (OH-ABA-OH) may be reacted first with a diisocyanate to provide NCO end-capping and introduce additional urethane linkages into the backbone. This reaction product is then further reacted with an aminoalkylenepolyalkoxysilane, such as N-cyclohexylaminomethyltrimethoxysilane. Such useful materials conform to the structure:

X

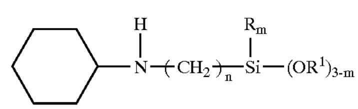

where variables are defined as in structural formula IX.

The process of preparing the inventive moisture curing compositions can be more easily understood by the following reaction schemes:

Reaction Schemes

Step 1(a) Formation of NCO Capped Poly(alkylene Ether) Diol (B) Block Segment Using Alternative Steps 1(a) or 1(b)

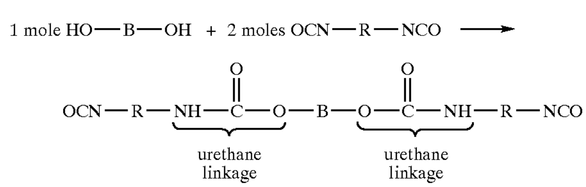

or

Step 1(b)

1 mole $H_2N$—B—$NH_2$ + 2 moles OCN—R—NCO ⟶

-continued

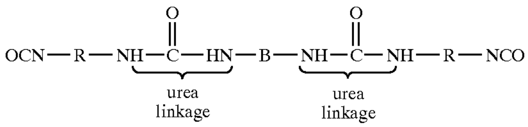

Step 2 Formation of ABA Triblock Segment

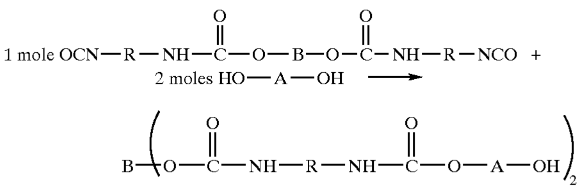

Step 3 Addition of Moisture Curing End-Capped Groups Using Alternative Steps 3(c) or 3(d)

Step 3(c)

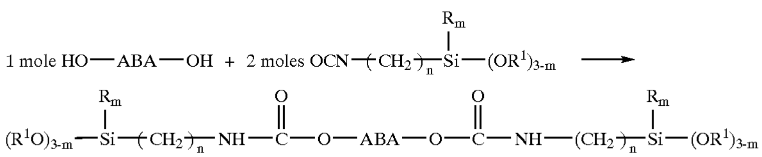

Final Moisture Curable Polymer where R is $C_{1-6}$ alkyl group or $C_6$ aryl group, which may optionally be substituted with halo, sulfur or oxygen;

$R^1$ is $C_{1-6}$ alkyl group; m is 0–2; and n is 1–3; or

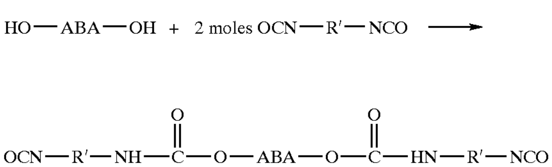

Step 3(d)

where R' is the organic diradical moiety between the diisocyanate groups and its identity depends on the particular diisocyanate chosen for the reaction.

These reaction products are further reacted with an aminoalkylenepolyalkoxysilane to provide a final moisture curable polymer.

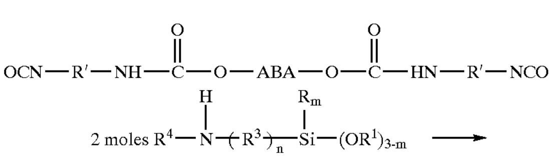

-continued

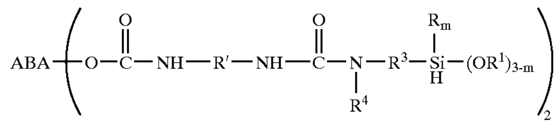

Final Moisture Curable Polymer where R is $C_{1-6}$ alkyl or $C_6$ aryl, which optionally may be substituted by halo, sulfur or oxygen;

$R^1$ is $C_{1-6}$ alkyl; $R^3$ is alkylene; $R^4$ is alkyl, aryl, alkaryl or arylalkyl; m is 0–2; and n is 1–3; and R' is as defined above.

The moisture curable compositions of the present invention may be obtained by adding to 100 parts by weight of the moisture curable triblock polymer prepared in accordance with the process of the present invention:

(a) 0 to 250 parts of inorganic filler;

(b) 0 to 20 parts of an adhesion promoter such as a silane or polysiloxane; and (c) an effective amount of a moisture curing catalyst.

The moisture curing catalyst may be present in amounts of about 0.01% to about 5% by weight of the total composition, and desirably in amounts of about 0.05% to about 2.5% by weight. Among the useful moisture cure catalysts are organometals selected from titanium, tin and zirconium compounds. For example, dibutyl tin dilaurate, tetraisopropoxytitanate and tetrabutoxytitanate may be used. Additionally, amines, phosphines and imidazoles may also be used. Among the specific useful compounds are 1,8-diazabicyclo [5.4.0] undec-7-ene (DBU) and dimethylaminopyridine. Certain of these catalysts are employed in the synthesis of moisture curable ABA triblock copolymer, as well as formulated into the final moisture curing composition.

Fillers may also be employed to change the viscosity and flow properties as well as the strength of the final composition. Such fillers include, without limitation, alkali metal carbonates, carbon black, fumed silica, precipitated silica, sulfates, metal silicates, metal oxides and combinations thereof.

Sillikolloid, available from Hoffmann Mineral, GmbH, clay filler has been found to be particularly useful for enhancing the physical properties of the cured inventive polymers. It has been discovered that the addition of sillikolloid clay filler substantially increased tensile strength, modulus, elongation at break, as well as hardness properties, as further described in the examples to follow.

Amounts of filler are generally about 5% to about 70% by weight of the total composition. More desirably, fillers may be present in amount of about 10% to about 45%.

Other additives such as plasticizers, diluents, fillers, coloring agents, pigments, viscosity modifiers, thixotropic agents and adhesion promoters may be added in conventional amounts for their intended purposes.

The invention may be further understood with reference to the following non-limiting examples. Percent weights are per the total composition unless otherwise specified.

EXAMPLES

The following inventive moisture curing, flexible ABA triblock compositions were prepared in accordance with the present invention, as shown in Table 1.

TABLE 1

Inventive Compositions

| COMPONENT | COMPOSITION (% weight) 1 | 2 | 3 | 4 | 5 |
|---|---|---|---|---|---|
| A Segments | | | | | |
| Poly(diethylene glycol phthalate)[1] m.w. 1000 | — | — | — | — | 25.7 |
| Poly(diethylene glycol phthalate)[2] m.w. 500 | 25.3 | 23.5 | 26.2 | 16.7 | |
| B Segments | | | | | |
| Poly(propylene oxide)diol[3] m.w. 2000 | 51.2 | — | 50.0 | — | — |
| Poly(propylene oxide)diol[4] m.w. 4000 | — | — | — | 67.7 | 60.2 |
| Poly(tetramethylene ether)diol[5] m.w. 2000 | — | 45.3 | — | — | — |
| Diisocyanate (TMXDI)[6] m.w. 244 | 12.4 | 11.4 | 12.1 | 8.4 | 7.5 |
| Moisture Cure End Capping | | | | | |
| Isocyanatopropyltrimethoxysilane | 10.3 | 9.4 | — | 6.7 | 6.1 |
| N-cyclohexylaminomethyltriethoxysilane | — | — | 11.2 | — | — |
| Catalyst[7] (required for formation of triblock copolymer) | .05 | .05 | .05 | .05 | .05 |
| Plasticizer[8] | — | 9.9 | — | — | — |
| Antioxidant[9] | 0.5 | 0.45 | 0.5 | 0.5 | 0.5 |

[1]Stepanpol PD 110 LV available from Stepan Chemical, Northfield, IL,
[2]Stepanpol PD 200 LV available from Stepan Chemical, Northfield, IL
[3]Acclaim 2200 available from Bayer Polymers LLC, Pittsburgh, PA
[4]Acclaim 4200 available from Bayer Polymers LLC, Pittsburgh, PA
[5]Polymeg 2000 available from Lyondell Chemical Co., Houston, TX
[6]Tetramethylxylylene diisocyanate
[7]Dibutyltin dilaurate
[8]Mesamoll L235 available from Bayer AG
[9]Irganox 1010 sterically hinered phenolic anti-oxidant, available from Ciba Chemicals Each of the inventive compositions in Table 1 above were prepared using the following procedure:

The polyalkylene ether (B Segment starting material, e.g. Acclaim or Polymeg) was added along with the diisocyanate, antioxidant and catalyst to the reactor. The reaction was permitted to proceed for 2 hours at 80° C. under a nitrogen blanket. The NCO content was then determined by titration. To this reaction mixture was added the polyester diol (A Segment) and the mixture was stirred for 2 hours at 80° C. The plasticizer was then added. The mixture was then checked by IR for the disappearance of NCO. Then the moisture cure end capping component was added and stirred for 1.5 hours at 80° C. to form the final moisture curing ABA triblock copolymer.

The resultant polymers, when permitted to moisture cure at ambient temperatures, produced strong, flexible materials.

The inventive compositions were then formulated with different amounts of filler to observe for changes in physical properties. These compositions are provided below:

EXAMPLE 6

TABLE II

| A/B/A | Weight % |
|---|---|
| NCO capped polyester/polyether/NCO capped polyester | 60.94 |
| Sillikolloid P87 Clay Filler | 30.80 |
| Aminopropyltrimethoxysilane | — |
| N-ethyl-aminoisobutyltrimethoxysilane | — |
| Hexamethyldisilazane (HMDZ) | 0.01 |
| Dibutyl tin dilaurate | — |
| N-cyclohexylaminomethyltriethoxysilane | 8.25 |

The copolymer and filler were combined in a mixer for 30 minutes at 2000 rpm. To this was added N-cyclohexylaminomethyltriethoxysilane at 70° C. Mixing was continued for about 30 minutes at about 80° C., at which time HDMZ was added and mixing was continued for 30 minutes under a nitrogen blanket. In this example, no moisture cure catalyst was required to effectuate cure.

Test samples in the form of sheets were then made. The sheets were about 6" long×6" wide×⅛" thick. The sheets were cured for 7 days at ambient conditions and tested for various physical properties. The results are shown below:

Test Results

Example 6

| Tensile Strength (psi) | 10% Modulus | 50% Modulus | % Elongation at Break | Shore A Hardness |
|---|---|---|---|---|
| 735.8 | 65.49 | 219.5 | 157.5 | 46 |

*Avg. of 2 samples

Example 7

TABLE III

| Inventive Compositions | Composition (grams) | | | | |
|---|---|---|---|---|---|
| Component | 7A | 7B | 7C | 7D | 7E |
| ABA copolymer formed from Composition 4 | 70 | 63 | 52 | 45.5 | 38.5 |
| Sillikolloid P87 Clay Filler | 0 | 7 | 17.5 | 24.5 | 31.5 |
| 1,8 diazabicyclo[5.4.0]-undec-7-ene* (catalyst) | 0.14 | 0.14 | 0.14 | 0.14 | 0.14 |

*DBU

Each of Compositions 7A–7E were cured into test sheets and their physical properties tested after 6 days of cure at ambient conditions.

Test Results

| Test Results | | | | | |
|---|---|---|---|---|---|
| Composition | % Filler | Tensile Strength (psi) | 50% Modulus | % Elongation at Break | Shore A |
| 7A | 0 | 133.5 | 66 | 129 | 28 |
| 7B | 10 | 322.3 | 84 | 125 | 38 |
| 7C | 25 | 548.7 | 143 | 141 | 50 |
| 7D | 35 | 671.1 | 596 | 112 | 55 |
| 7E | 45 | 795.7 | 482 | 79 | 65 |

As shown in the table above, each of the physical properties increase when additional filler is added as compared to the composition without filler. At high levels of filler, the % elongation at break begins to decrease. This is believed to be partially due to substitution of filler for poly(propylene oxide) content (Segment B).

Example 8

TABLE IV

| Inventive Compositions | Composition (grams) | | | | |
|---|---|---|---|---|---|
| Component | 8A | 8B | 8C | 8D | 8E |
| ABA copolymer formed from Composition 5 | 70 | 63 | 52.5 | 45.5 | 38.5 |
| Sillikolloid P87 Clay Filler | 0 | 7 | 17.5 | 24.5 | 31.5 |
| DBU | 0.14 | 0.14 | 0.14 | 0.14 | 0.14 |

After 6 days of cure at ambient conditions, the test sheets were tested for their physical properties.

Test Results

TABLE V

| Composition | % Filler | Tensile Strength (psi) | 50% Modulus | % Elongation at Break | Shore A |
|---|---|---|---|---|---|
| 8A | 0 | 185.9 | 42.9 | 181.6 | 24 |
| 8B | 10 | 258.9 | 73.1 | 135.6 | 26 |
| 8C | 25 | 367.5 | 128.0 | 112.6 | 46 |
| 8D | 35 | 298.2 | 118.0 | 169.8 | 46 |
| 8E | 45 | 577.9 | 440.8 | 67.9 | 43 |

As shown in the table above, each of the physical properties increase when additional filler is added as compared to the composition without filler. At high levels of filler, the % elongation at break begins to decrease. This is believed to be partially due to substitution of filler for poly(propylene oxide) content (Segment B).

Figure 2:
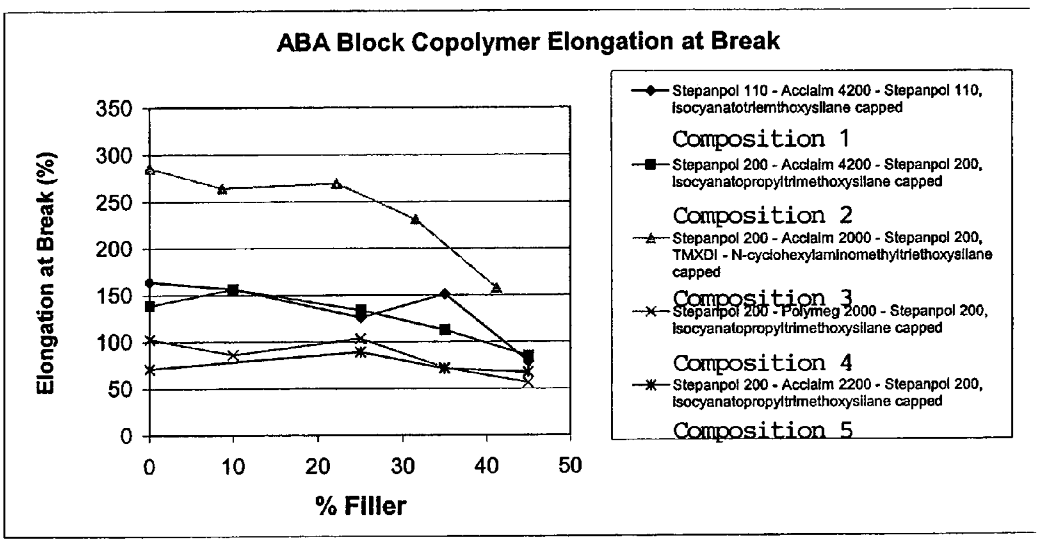
FIG. 2 is a graphic depiction of the effect on elongation at break by the addition of filler or inventive compositions 1–5 disclosed herein.

As shown in FIG. 1, the tensile strength of inventive compositions 1–5 increased dramatically as the filler content increased. FIG. 2 shows the % elongation at break declined as the filler content increased.

What is claimed is:

1. A moisture curable composition comprising a polymer having the formula:

I

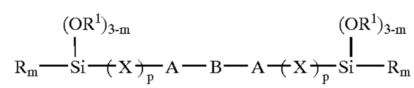

wherein ABA is a polyester/polyether/polyester triblock copolymer, wherein the polyester (A) blocks comprise a poly(diethylene glycol o-phthalate) block;

R is $C_{1-6}$ alkyl group or $C_6$ aryl group, which may optionally be substituted by halo;

$R^1$ is $C_{1-6}$ alkyl group;

m is 0–2;

X is independently at each occurrence a urethane linkage

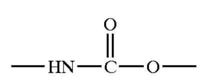

or a urea linkage

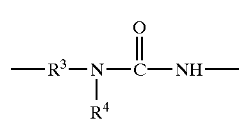

wherein $R^3$ is alkylene; $R^4$ is alkyl, alkaryl or arylalkyl; and p is 0 or 1.

2. The composition of claim 1, wherein the polyether (B) block comprises a poly(propylene oxide) block.

3. The composition of claim 1, wherein the polyether (B) block comprises a poly(tetramethylene ether) block.

4. The composition of claim 1, wherein the polyether (B) block has a molecular weight of about 2,000 to about 4,000.

5. The composition of claim 1, wherein the polyester (A) block has a molecular weight of about 500 to about 1,000.

6. The composition of claim 1, further including a moisture cure catalyst.

7. The composition of claim 6, wherein the moisture cure catalyst is selected from the group consisting of amines, organometallic compounds, phosphines, imidazoles, and combinations thereof.

8. The composition of claim 1, further including one or more fillers.

9. The composition of claim 8, wherein a filler is selected from the group consisting of alkali metal carbonates, carbon black, fumed silica, precipitated silica, sulfates, metal silicates, metal oxides and combinations thereof.

10. A moisture curable composition comprising:

(a) a polymer having the formula:

I

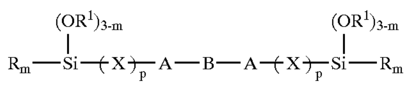

wherein ABA is a polyester/polyether/polyester triblock copolymer;

R is $C_{1-6}$ alkyl group or $C_6$ aryl group, which may optionally be substituted by halo;

$R^1$ is $C_{1-6}$ alkyl group;

m is 0–2;

X is independently at each occurrence a urethane linkage

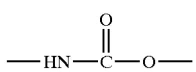

or a urea linkage

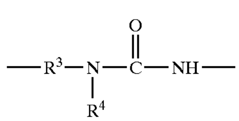

wherein $R^3$ is alkylene; $R^4$ is alkyl, aryl, alkaryl or aryalkyl; and p1 is 0 or 1; and (b) a moisture cure catalyst wherein the moisture curing catalyst is selected from the group consisting of 1,8-diazabicyclo[5.4.0] undec-7-ene, dimethylaminopyridine and combinations thereof.

11. A method of preparing a moisture curing composition comprising the steps of:

(a) reacting a NCO capped polyether with a polyester diol having each of two ends terminated with a hydroxy group, wherein the molar ratio of NCO capped polyester prepolymer to polyester diol being equal to or less than 1:2 to form a block copolymer represented by the structure:

HO-A-B-A-OH II wherein B is a polyether block and A is a polyester block; and (b)(i) further reacting the structure formed in step (a) with a molar excess of an isocyanatoalkyl polyalkoxysilane to form a moisture curable composition; or (b)(ii) further reacting the hydroxy terminated polyester/polyether/polyester triblock copolymer (II) with a diisocyanate to provide NCO capping at each end of the triblock copolymer; and further reacting the product of this reaction with an aminoalkylenepolyalkoxysilane to form a moisture curable composition.

12. The method of claim 11, further including the steps of forming the NCO capped polyether comprising reacting a polyether, functionally terminated with either hydroxy groups or amino groups, with a diisocyanate, wherein the molar ratio of diisocyanate functionally terminated polyether is at least about 1:2.

13. The method of claim 11, wherein the polyether (B) block has a molecular weight of from about 2,000 to about 4,000.

14. The method of claim 11, wherein the polyester (A) block has a molecular weight of about 500 to about 1,000.

15. The method of claim 11, wherein the polyether (B) block is a poly(propylene oxide) block.

16. The method of claim 11, wherein the polyether (B) block is a poly(tetramethylene ether) block.

17. The method of claim 11, wherein the isocyanatoalkyl polyalkoxy silane is selected from the group consisting of isocyanatopropyltrimethoxy silane, isocyanatoethyltrimethoxy silane, and isocyanatomethyltrimethoxy silane.

18. The reaction product of (a) a composition comprising a compound having the formula:

I

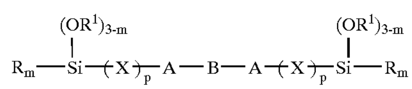

wherein ABA is a polyester/polyether/polyester triblock copolymer, wherein the polyester (A) blocks comprise a poly(diethylene glycol o-phthalate) block;

R is $C_{1-6}$ alkyl group or $C_6$ group, which may optionally be substituted by a halo;

$R^1$ is $C_{1-6}$ alkyl group;

m is 0–2;

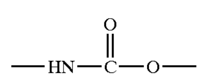

X is independently at each occurrence or

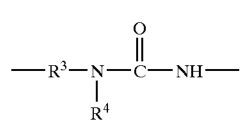

wherein $R^3$ is alkylene; $R^4$ is alkyl, aryl, alkaryl or aryalkyl; and p is 0 or 1; and (b) a moisture cure catalyst.

19. The reaction product of (a) a composition comprising a compound having the formula:

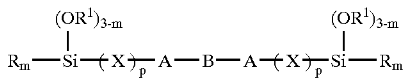

I wherein ABA is a polyester/polyether/polyester triblock copolymer;

R is $C_{1-6}$ alkyl group or $C_6$ group, which may optionally be substituted by a halo;

$R^1$ is $C_{1-6}$ alkyl group;

m is 0–2;

X is independently at each occurrence

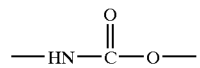

or

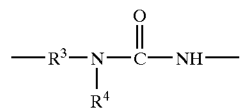

wherein $R^3$ is alkylene; $R^4$ is alkyl, aryl, alkaryl or aryalkyl; and p is 0 or 1; and (b) a moisture cure catalyst, wherein the moisture curing catalyst is selected from the group consisting of 1,8-diazabicyclo[5.4.0] undec-7-ene, dimethylaminopyridine and combinations thereof.

* * * * *